W. D. DOREMUS.
COTTON GIN.
APPLICATION FILED DEC. 20, 1907.

938,224.

Patented Oct. 26, 1909.
7 SHEETS—SHEET 6.

Witnesses

Inventor
Willard D. Doremus
By
Attorney

W. D. DOREMUS.
COTTON GIN.
APPLICATION FILED DEC. 20, 1907.
938,224.
Patented Oct. 26, 1909.
7 SHEETS—SHEET 7.
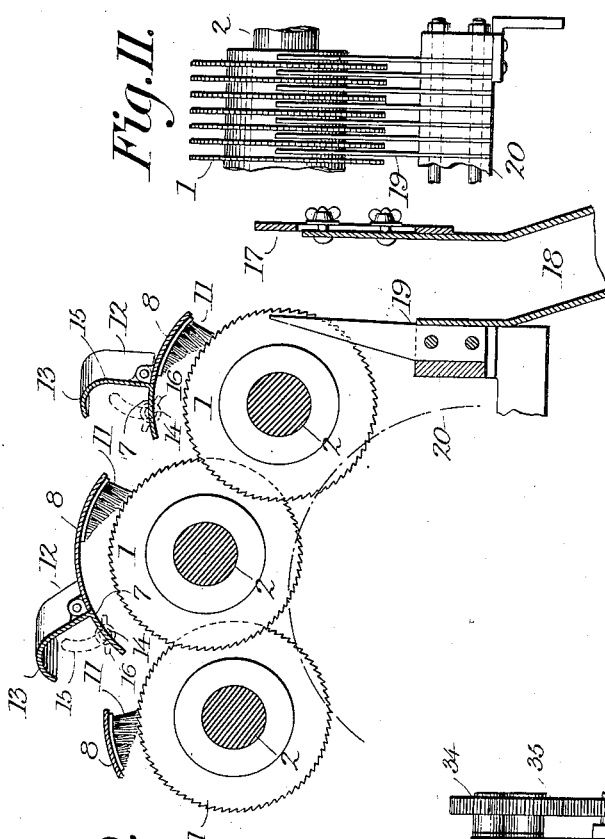
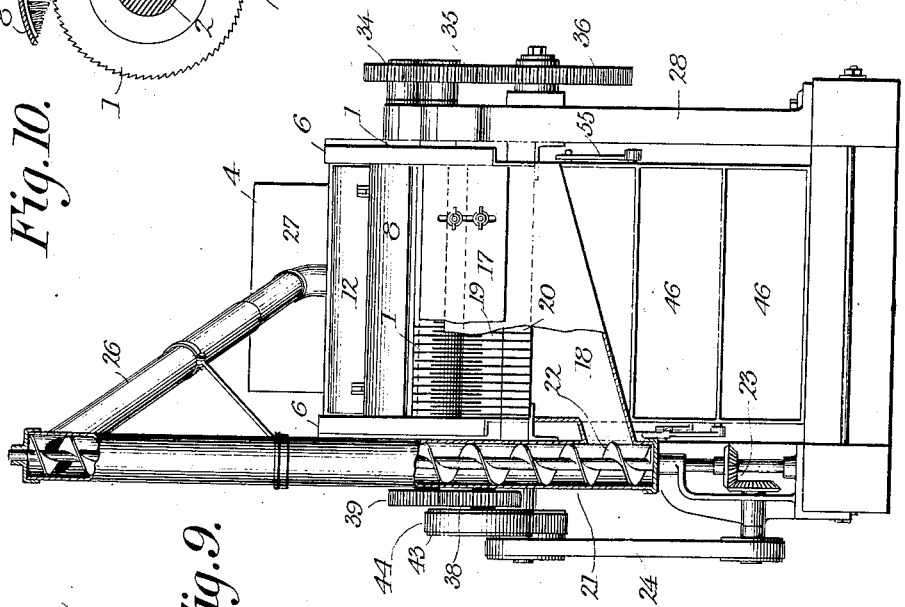
Witnesses
Inventor
Willard D. Doremus
Attorney

UNITED STATES PATENT OFFICE.

WILLARD D. DOREMUS, OF WASHINGTON, DISTRICT OF COLUMBIA, ASSIGNOR, BY MESNE ASSIGNMENTS, TO NATIONAL COTTON IMPROVEMENT COMPANY, A CORPORATION OF MAINE.

COTTON-GIN.

938,224.     Specification of Letters Patent.     Patented Oct. 26, 1909.

Application filed December 20, 1907. Serial No. 407,365.

*To all whom it may concern:*

Be it known that I, WILLARD D. DOREMUS, a citizen of the United States, residing at Washington, in the District of Columbia, have invented certain new and useful Improvements in Cotton-Gins, of which the following is a specification.

This invention relates to cotton gins.

The object of the invention is to provide a cotton gin of such construction that the fiber of seed cotton may be freed from seed without materially shortening or in any way injuring the fiber and without breaking or abrading the seed.

With this object in view the invention consists of the novel, broad and specific features of construction and arrangement of parts substantially as hereinafter described and claimed.

The principle involved in the invention is capable of embodiment in various forms of machines and one form is herein described and illustrated in the accompanying drawings in which:—

Figure 1:
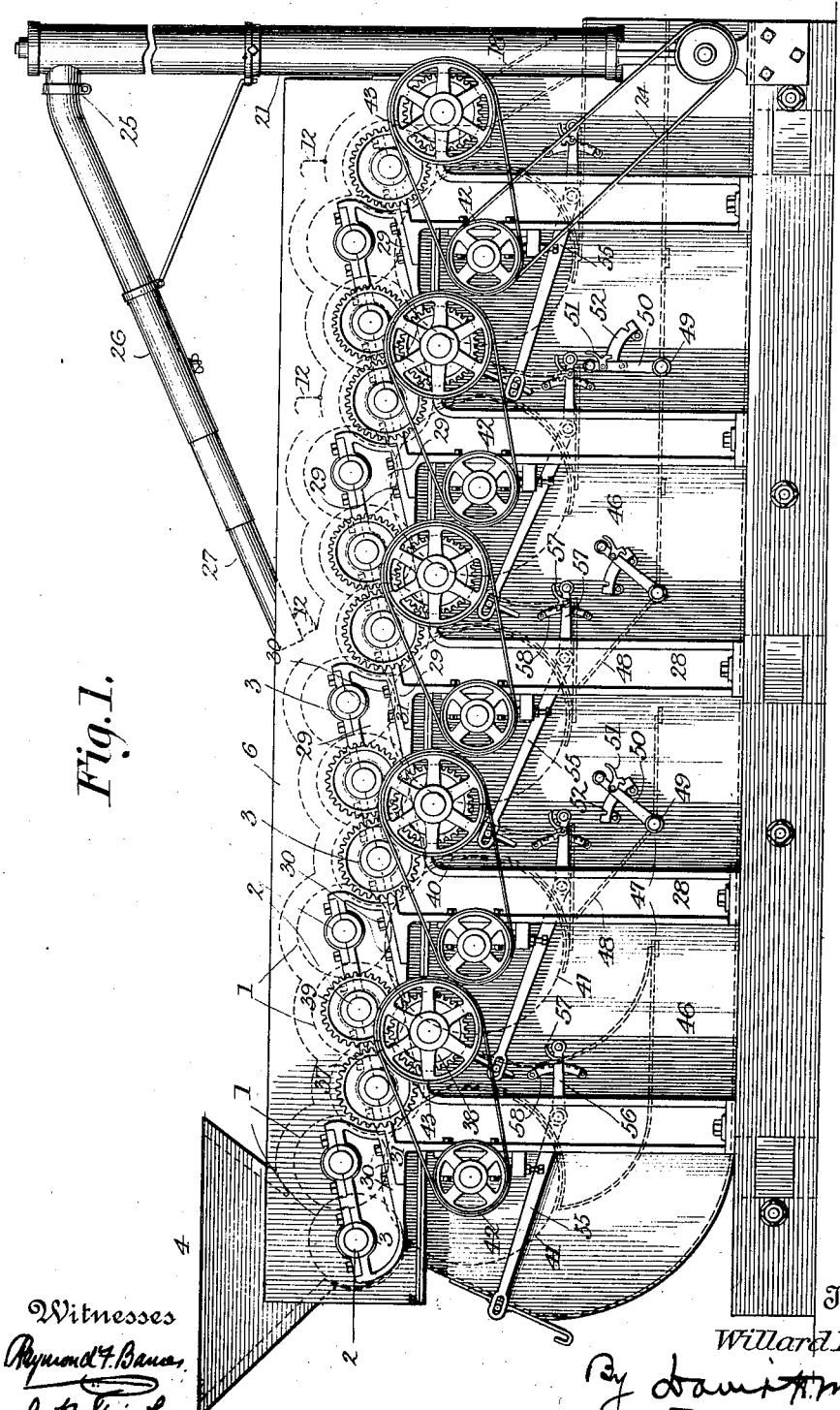
Figure 2:
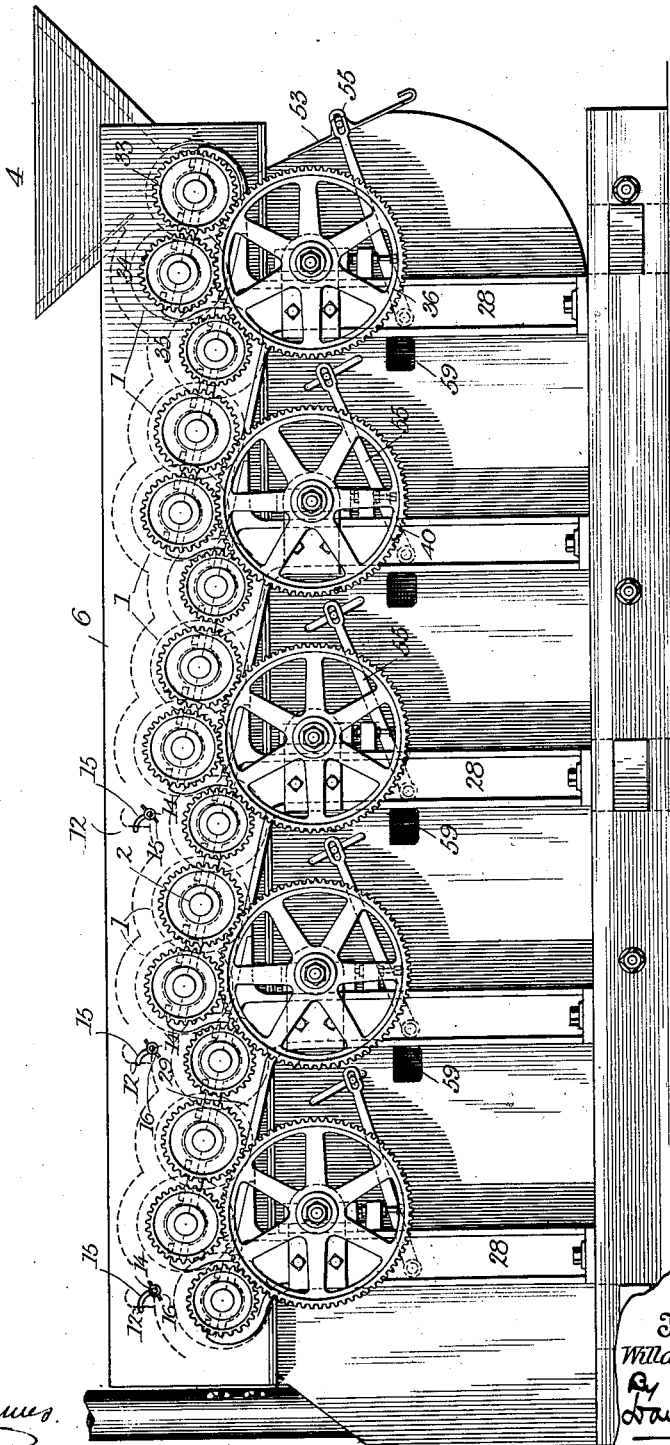
Figure 3:
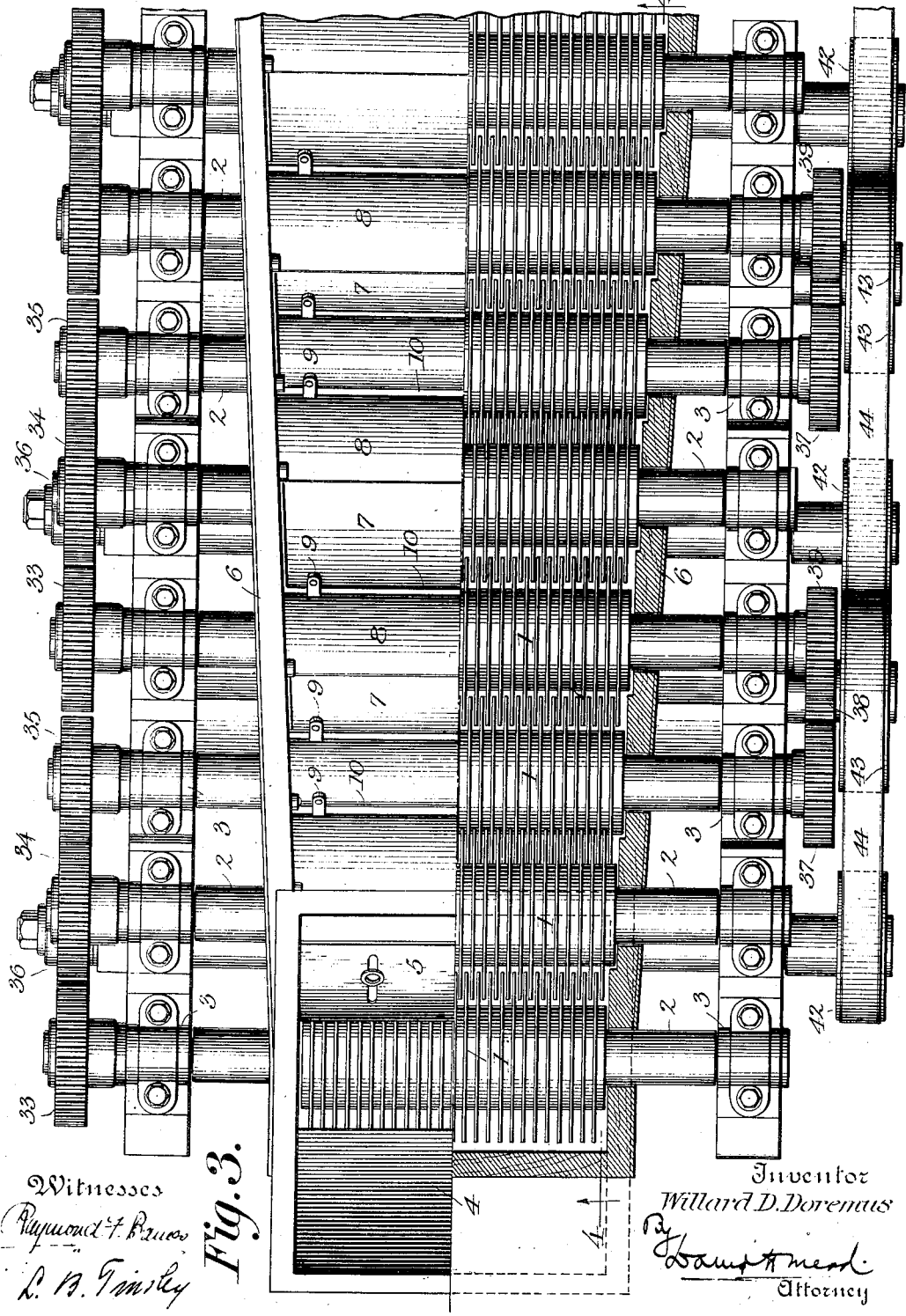
Figure 4:
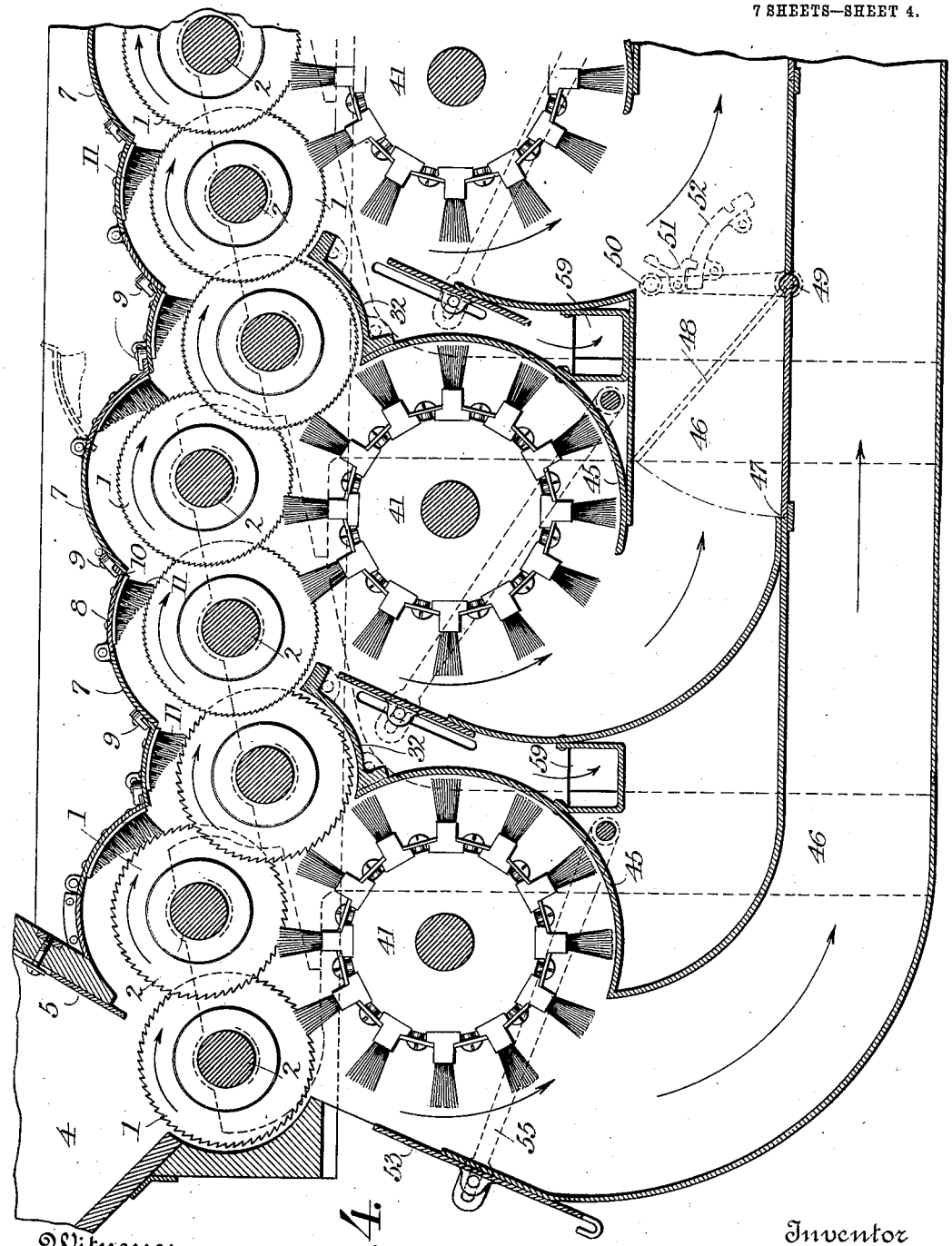
Figure 5:
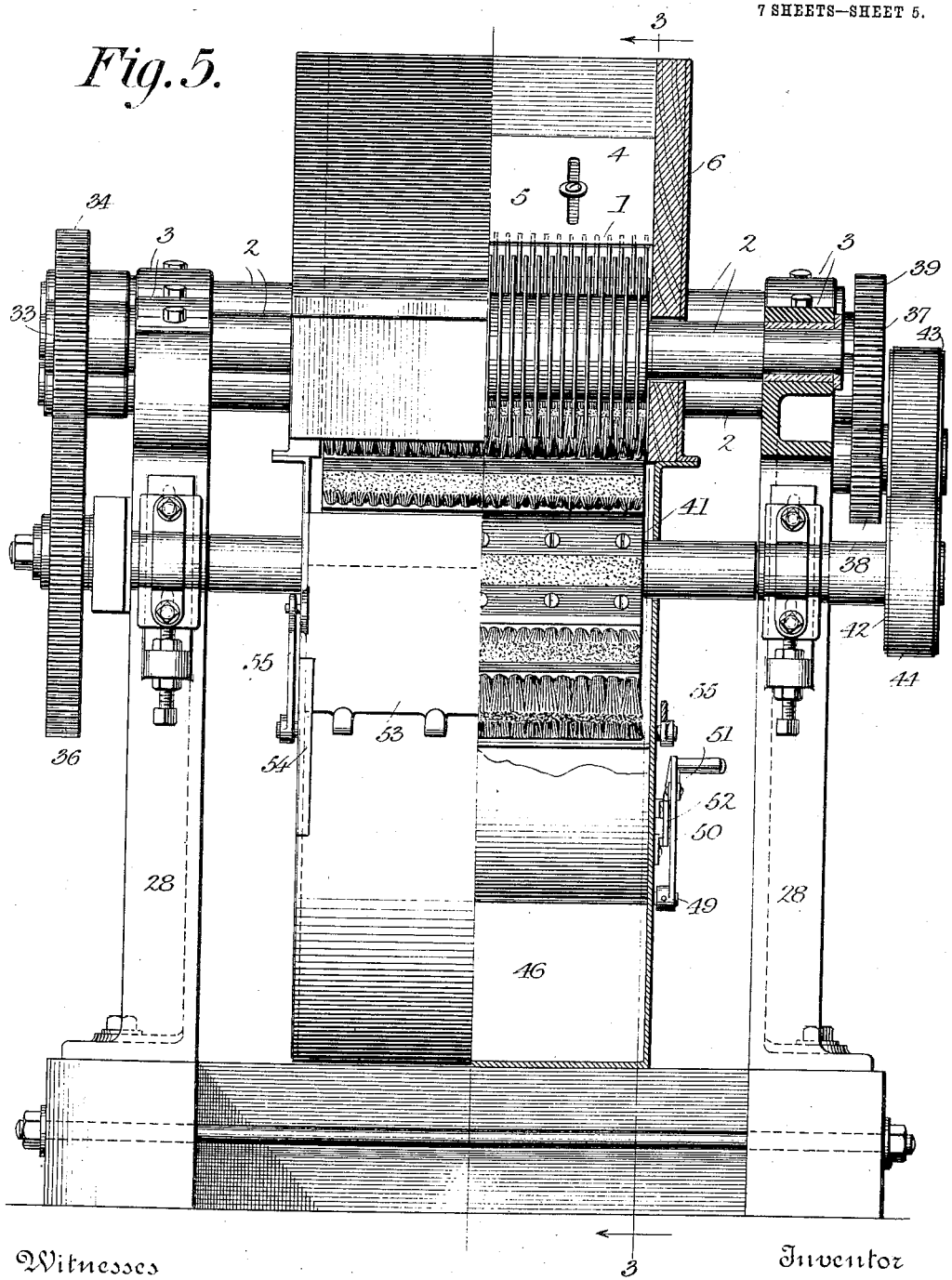
Figure 6:
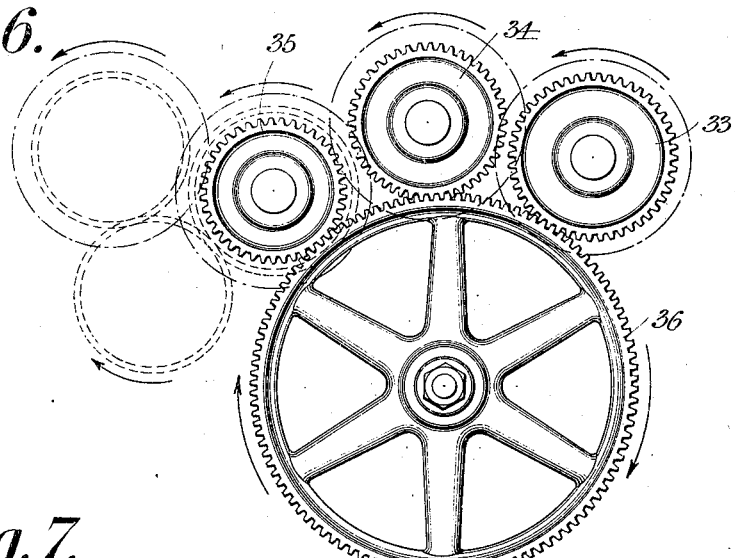
Figure 7:
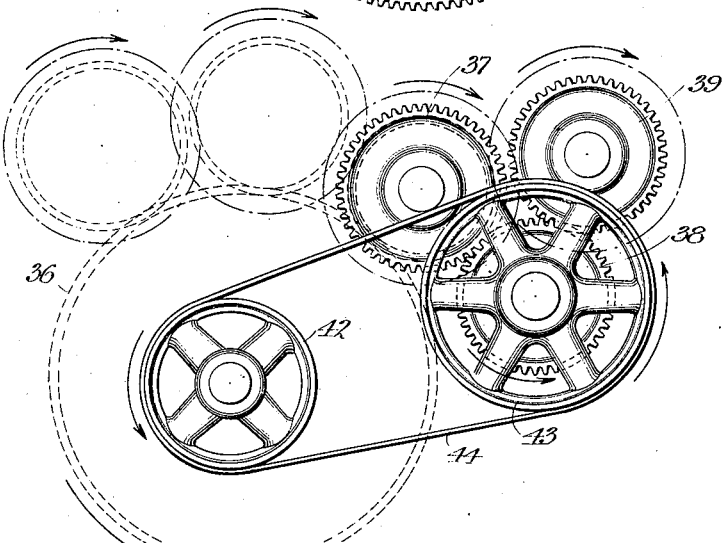
Figure 8:
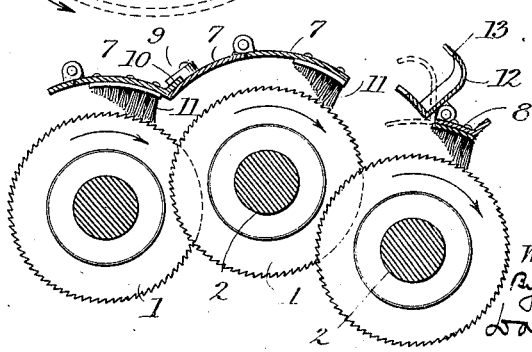

Figure 1 is a side view of the gin; Fig. 2 is a view showing the side opposite to that shown in Fig. 1; Fig. 3 is a plan view of the feed end of the gin, a portion of the covering of the saws and of the hopper being removed to show the arrangement of the saws; Fig. 4 is an enlarged fragmentary view partly in section showing the arrangement of the saw cylinders, the brushes for removing fiber from the cylinders, and their appurtenances; Fig. 5 is an end view showing the feed end of the machine, a portion of the feed hopper and of the fiber conduit being removed; Fig. 6 is a detail view showing a portion of the driving gear on one side of the gin; Fig. 7 is a view showing a portion of the driving gear located on the side opposite to that on which the gear shown in Fig. 7 is located; Fig. 8 is a detail view showing the two forms of coverings for the cylinders; Fig. 9 is an end view of the discharge end of the gin; Fig. 10 is a detail view showing means for removing seed from the last cylinder of the series and the means for governing the discharge of seed from the last cylinder; and, Fig. 11 is a detail view showing the means for removing seed from the last cylinder.

The principal operative feature of a cotton gin constructed in accordance with my invention is a series of saw cylinders, all adapted to revolve in the same direction, and so placed in relation to each other that the separation of the fiber and seed of seed cotton is performed by the coaction of the surfaces of the cylinders. In the form of the machine shown in the present illustration a series of saw cylinders are mounted on a frame of such form that the series extends substantially in a horizontal line from end to end. The seed cotton is fed to one end of the series, the fiber is discharged from the gin as it is separated from the seed by the action of the various cylinders and the principal portion of the seed so separated is discharged from the machine at the end of the series opposite to that at which the seed cotton is introduced.

The saw cylinders employed, consist of a suitable number of gin saws 1 mounted on shafts 2, the saws being so secured on the shafts in respect of each other as to leave between adjacent saws a space of a width to allow fiber to pass through it without injury and which is too narrow to permit the entrance therein of cotton seed. The saw cylinders are so mounted on a frame, the construction of which will be described hereinafter, that the saws of each cylinder are opposite the centers of the space between the saws of the adjacent cylinder or of adjacent cylinders. Bearings 3 in which the shafts of the saw cylinders are mounted are arranged at such distances apart that the teeth of contiguous cylinders are maintained in close relation to each other, the preferred arrangement being that shown in the drawing wherein the toothed peripheries of the saws of each cylinder overlap those of each adjacent cylinder or cylinders. By this arrangement of the parts there is formed a continuous surface of saw teeth from end to end of the gin, and by reason of overlapping the saws of adjacent cylinders as described, the transverse depression between the bodies of each pair of cylinders is of an angle too great to allow of the lodgment and injury therein of seed carried over the operative surface of saw teeth. The distance which the saws overlap may be varied if required to adapt the gin for use on cotton containing seed of different size. In practice I have found that an overlap of such an extent as to give to the depressions between the cylinders an approximately right angular contour will universally produce good results.

Seed cotton to be ginned is fed to the first saw cylinder of the series in any suitable way as through a hopper 4 which discharges adjacent to the face of the first cylinder, preferably upon the upper portion thereof as shown. Those cylinders located at the inlet or feed end of the gin are preferably provided with larger teeth than those of the remaining cylinders in order to insure engagement of seed cotton in whatever condition it may be when introduced into the machine. In the drawings I have shown the first three cylinders as having these larger teeth, but the number so made may be varied as required. The seed cotton fed into the machine is first engaged by the teeth of the initial cylinder and the teeth of this cylinder will take a charge of fiber which, as the cylinder revolves in the direction of the projection of its teeth, will be carried forward, bringing it into contact with the teeth of the second cylinder. Inasmuch as all the cylinders revolve in the same direction the seed cotton directly engaged by the teeth of the first cylinder and with which such teeth are loaded will as it is drawn between the first and second cylinders, be subjected to a combing action by means of which the seed of the cotton so engaged will be drawn from the fiber and carried onward by the second cylinder. The cleaned fiber is carried to the side of the cylinder opposite to that at which it is engaged and there removed. The fiber directly engaged by the teeth of the first cylinder will carry onward with it, by reason of frictional contact, a quantity of superimposed seed cotton, and this will be carried by the teeth of the second cylinder, a portion thereof being engaged and ginned between the second and third cylinders while the seed removed by the first operation together with excess seed cotton and the seed removed by the second operation will be carried toward and operated upon in like manner by succeeding cylinders in turn. The thickness of the charge of seed cotton taken by the first cylinder is regulated by the adjustable plate 5, located at the outlet side of the hopper 4, and by this only a quantity of seed cotton which may be operated upon to advantage is permitted to pass into the gin. Each succeeding saw cylinder from the inlet end of the gin to the outlet end thereof is of a greater length than that of the preceding cylinder, the difference in length being sufficient to furnish an overlap of at least one saw at each end. By this means the action of ginning is made certain in that it insures the action of every succeeding cylinder upon the entire quantity of fiber directly engaged by the teeth of a preceding cylinder to comb out the seed of the cotton so engaged. Further this construction makes certain the carrying forward of all seed cotton not ginned, and seed, in order that the cotton may be presented to the action of other cylinders following the series for action and the seed may be moved onward and ultimately discharged from the gin.

The operation of the saw cylinders to free the cotton from seed and to move onward excess of seed cotton and seed being performed by such cylinders while revolving at a comparatively high rate of speed, it is necessary to confine the material and to prevent its projection from the faces of the cylinders by centrifugal force. To accomplish this, side pieces 6 extend the entire length of the gin adjacent to the ends of the cylinders and their inner faces are of such a form as closely to inclose the cylinder ends, and each cylinder is provided with a covering. The lower face of the covering conforms to the shape of the face of the cylinder over which it is placed and consists of two parts 7 and 8, both of which are pivotally connected to and supported by the side pieces 6. The sectional plates covering a number of the cylinders at the feed end of the gin are formed to abut against each other in order to form a continuous covering and each part 7, is provided with pivoted fingers 9, which are adapted to bear against flanges 10, with which the part 8 of an adjacent covering is provided in order to retain the coverings in position. Access to the cylinders is obtained by releasing the fingers from the flanges and by moving the parts of the covering on their pivots. The portion 8 of each covering has on the lower face thereof a projection 11 by means of which cotton carried through the passage formed over the cylinders by the side pieces and the coverings is directed upon and closely confined to the cylinder covered by it at a point a short distance in advance of that at which the saws of the cylinder are intersected by those of the next succeeding cylinder in order to insure the taking of a full charge by each tooth of the saws as it passes beneath the projection. The projection is preferably thin at its forward end where the cotton first contacts with it and gradually increases in thickness in order to form an inclined lower face terminating close to the face of the cylinder. The projection is preferably of a construction or of such material as to render its face yielding to avoid injury to the fiber of the cotton confined by it, and at the same time to offer no obstruction to the passage of cotton and seed. It may, with advantage, be made of bristles of metal, hair, fiber or similar material.

The coverings of a portion of the cylinders toward the discharge end of the gin have the portions 8 thereof of a length to leave exposed that part of the upper surface of the cylinder covered by it which is toward the discharge end of the gin. In this form of covering which is particularly illustrated in Figs. 8 and 10 of the drawing, the portion 7 has extending from its upper face a flange 12, which extends across it at an angle and which has an overlapping outer end 13. Portions 7 used in connection with the shorter sections 8 each have a screw threaded rod 14, which projects through a slot 15 in one of the side pieces 6 and on the rod is a thumb nut 16, adapted to bear against the outer face of the side piece in order to retain the portion 7 in any position to which it may be moved.

The coverings of the construction last described are located at that part of the machine through which will pass more or less seed entirely freed of fiber by the action of the first saw cylinders. As such seed being heavier than seed cotton or fiber is acted upon by the partially uncovered cylinders, it will be thrown from them at a tangent against the flange 12 of the covering of the next cylinders and by it will be deflected from the machine. Any foreign substances such as bolls, stones, dust, etc. being also heavier than seed cotton will be thrown from the gin in like manner as the free seed thus freeing the cotton from objectionable matter.

The plate 7 of the coverings is capable of adjustment to determine the quantity and character of matter thrown from the uncovered portion of a cylinder which is allowed to pass from the gin and therefore only clean seed and heavy foreign substances may be discharged by this means and throwing out of fiber or of seed having fiber adhering thereto in the manner described may be prevented. As the plate is moved upward on its pivot it forms an inclined surface by which matter thrown as described will be directed back into the gin, and by retaining it in the position shown by full lines in Fig. 8 of the drawing the discharge of anything at the point at which it is located may be prevented.

The possibility of injury to fiber or of lodgment of seed between cylinders during ginning as it takes place as described, or of injury to excess of seed cotton and seed carried along by the operation of the cylinders by subjecting them to any grinding action between the sets of teeth of the cylinders is prevented by giving to each cylinder after the first, a greater speed of rotation than that of the cylinder next in advance of it and with which it coöperates. Thus when fiber having seed adhering thereto is engaged by the teeth of a cylinder and brought to a position to have the seed combed from it by the teeth of a succeeding cylinder, the latter will move such seed and any excess of seed cotton and seed carried by the cotton of seed cotton and seed carried by the cotton being ginned away from the space between the two cylinders more rapidly than they can be drawn into that space by the teeth of the saws of a preceding cylinder.

Any desired number of saw cylinders may be employed there being preferably sufficient to insure the thorough removal of all the fiber from the seed of the cotton admitted to the machine after being acted upon between the last two cylinders. Clean seed is thrown from the last cylinder in a substantially horizontal direction in line with the shaft of such cylinder, while seed having a small quantity of fiber adhering thereto, will, to a certain degree, cling to the teeth of the cylinder. To prevent the discharge from the machine of seed carrying fiber with clean seed, there is arranged adjacent to the last cylinder of the series a board 17 capable of vertical adjustment and between this board and the cylinder is a descending chute 18. The board is so placed that entirely clean seed will be thrown over its top free of the machine while seed having a small quantity of fiber adhering to it will be directed in the chute 18. Any seed which may reach the last cylinder with sufficient fiber on it to cause it to cling to the teeth of the last cylinder is removed in any suitable way as by the comb 19. This consists of a bar 20, attached to the frame of the machine and having taper teeth extending upward therefrom. The teeth correspond in thickness to the width of the space between the saws of the cylinder and they are of a number to provide a tooth to project into all the spaces between the saws and along the outer faces of the end saws. The comb is placed in such position that the ends of the teeth are located a short distance inside the rear face of the cylinder and from this point they extend downward intersecting the edges of the saws in rear of the shaft on which the latter are mounted. As seed is carried by the saws into contact with the teeth of the comb, it is freed by the latter and falls into the chute 18. The chute 18 leads to and communicates with the bottom of an upright cylindrical casing 21 into which it discharges. Arranged in the casing is a worm 22 driven by suitable gearing 23, connected by a belt 24, with a band wheel on the shaft of one of the brushes which will be hereinafter described. Connected to the top of the casing 21, by a pliable joint 25, is a telescoping tube 26, the end 27 of which is capable of being placed over and discharging into any desired one of the openings over the saw cylinders. By this means any seed which, when it reaches the last saw cylinder, has more or less fiber on it, is subjected for the second time to the ginning action of any number of the cylinders which may be necessary to entirely clean it.

For convenience of construction and to facilitate lengthening and shortening the frame of the machine to allow the use of a greater or less number of saw cylinders as may be required, the frame is preferably made up of sections. Each section is composed of a leg or standard 28, and an arm 29, extending therefrom. The arm of each standard preferably extends therefrom at an angle and they are of such a form that the lower face of the upper portion of one section rests upon the upper face of the lower portion of the arm of an adjoining section, there being at these points overlapping flanges 30, which are connected by bolts 31. The sections are placed in pairs each member of which is placed on an opposite side of the gin to that of its fellow and the members are connected by a cross piece 32, secured to opposite legs.

The saw cylinders are driven by any suitable gearing to impart to each successive cylinder from the inlet to the outlet of the machine, a greater speed than that of a preceding cylinder. This gearing may be of any suitable arrangement such for instance as that shown particularly in Figs. 6 and 7, of the drawing. As shown the saw cylinders are arranged in sets of three and each cylinder is provided on one end with a gear and the end of the outer cylinder of each set is provided at each end with a gear. The first cylinder is provided with a gear 33, to which a suitable speed is imparted, the second cylinder is provided with a gear 34, of somewhat smaller diameter than that of the first, while the third cylinder has a gear 35, smaller in diameter than that of the second cylinder. The three gears all mesh with an intermediate gear 36, so that each successive cylinder rotates at a higher rate of speed than that of the one in advance of it. On the end of the third cylinder of each set opposite to that bearing the gear 35, is a gear 37, of the same diameter as that of the gear 33, and this gear 37, meshes with an intermediate gear 38. The intermediate gear 38, meshes with a gear 39, on the shaft of the first cylinder of the next set of cylinders and all the gears of the second set of cylinders correspond in size to those employed on the first set and are connected by an intermediate gear 40, corresponding to that of the first set. The first and last of each cylinder of the following sets are connected as described throughout the series and thus the desired relative speeds of the cylinders is obtained.

The brushes 41, by which the ginned fiber is removed from the saws are mounted in bearings 42, attached to the uprights of the frame. The bearings are adjustable in order to allow the brushes to be moved toward the cylinders to compensate for wear. The shaft of each brush is concentric with the shafts of the last two cylinders of one set of cylinders and that of the shaft of the first cylinder of the next set, and is so placed as to contact with the lower faces of these three cylinders in order that in revolving it may free them from ginned fiber. In accordance with this arrangement the first section of the frame adjacent to the feed carries only two cylinders. Each brush is provided on its shaft with a band wheel 42$^a$, which is connected to and driven from a similar band wheel 43, fixed to the shaft of one of the intermediate gears 38, by means of a belt 44. The relative sizes of the band wheels is such that the brushes are driven at a higher rate of speed than the cylinders. The brushes are each partially surrounded by a casing 45, which communicates with a conduit 46, by which the fiber removed from the saws is conveyed to a condenser or place of storage. A number of these conduits are preferably employed, each having its inlet end arranged a different distance from the feed end of the gin in order to receive and separately convey from the gin the fiber ginned by saw cylinders located at different distances from the inlet of seed cotton. In this way provision is made for separating and carrying to different points of discharge the fiber ginned at different points in the series of saw cylinders. Thus should the fiber become at all shortened by contact with a number of cylinders before being entirely removed from the seed, it will, when finally removed, be received by a separate conduit than that receiving the fiber operated upon by the first cylinders only. Any suitable number of conduits may be employed and they are arranged parallel to and communicate with each other through openings 47, arranged at various points in their length in order that fiber received by one conduit may if desired be introduced into and mixed with that of another which contains fiber of a similar length. The openings are provided with doors 48, rigidly mounted on rods 49, which are capable of rotating. Each rod 49 has on it a handle 50, located on the outside of the conduit, and each handle is provided with a dog 51, adapted to enter notches in a segment 52, in order that the doors may be moved to and held in position to open or close the openings.

The brushes rotate in the direction indicated by the arrows in Fig. 4 of the drawing, and that side of the wall of the conduit of each brush against which fiber will first be thrown after being removed from the teeth of the saw cylinders, is provided with a mote board 53, which may be raised or lowered to permit discharging over it by the action of the brush free of the fiber, any heavy foreign substances which may be carried by the fiber. The mote boards are held in ways 54, on the outer faces of the conduits and they are moved to and retained in required position by the levers 55. The levers are pivoted to the frame of the machine and have rigid with them operating arms 56. These arms have on them pivoted dogs 57, adapted to engage notches in a segment 58, and thus the mote boards may be moved to and secured in proper position to allow the discharge of heavier foreign matter and to prevent the discharge of the fiber. Located outside each conduit and below its mote board are the inclined troughs 59, which receive and discharge at the side of the gin the matter projected over the mote board.

In ginning cotton, by the means herein described, the fiber is at no time in its treatment subjected to injurious strain liable to shorten it. A charge of seed cotton engaged by the teeth of the saws of a cylinder is brought into position adjacent to the saws of an adjoining cylinder and the separation of the seed from the fiber is performed by the combing action of the teeth of this adjoining cylinder which latter rotates in the same direction at a higher rate of speed than the first cylinder. This method is obviously superior to the usual method in which a charge of seed cotton is engaged by the teeth of a rapidly revolving saw and brought into violent contact with a rigid rib for the purpose of separating the fiber and seed. The fiber is freed from foreign matter during ginning or upon being carried into a discharge conduit rendering subsequent cleaning unnecessary.

While I have herein described and claimed a specific construction of apparatus for carrying into effect the principle involved in my invention, I do not, of course, in any sense limit myself thereto, as the invention resides broadly in the idea of a series of saw cylinders so arranged that the teeth of adjacent cylinders coact to produce the effect described.

Having thus described my invention, what I claim as new and desire to secure by Letters Patent, is:—

1. A cotton gin comprising a series of saw cylinders so arranged that the saws of adjacent cylinders overlap, whereby fiber engaged by the saws of one cylinder is freed from seed by the coaction of such saws with those of an adjacent cylinder, substantially as described.

2. A cotton gin comprising a series of saw cylinders so arranged that the saws of adjacent cylinders overlap, whereby fiber engaged by the saws of one cylinder is freed from seed by the coaction of such saws with those of an adjacent cylinder, and means for removing fiber from the cylinders, substantially as described.

3. A cotton gin comprising a series of saw cylinders so arranged that the saws of adjacent cylinders overlap, all the cylinders being adapted to rotate in the same direction, whereby fiber engaged by the saws of one cylinder is freed from seed by the coaction of such saws with those of an adjacent cylinder, substantially as described.

4. A cotton gin comprising a series of saw cylinders so arranged that the saws of adjacent cylinders overlap, and means for rotating the cylinders in the direction of the projection of the teeth of their saws, whereby fiber engaged by the teeth of the saws of one cylinder is freed from seed by the coaction of such saws with those of an adjacent cylinder, substantially as described.

5. A cotton gin comprising a substantially horizontal series of saw cylinders so arranged that the saws of adjacent cylinders overlap, whereby fiber engaged by the saws of one cylinder is freed from seed by the coaction of such saws with those of an adjacent cylinder and excess of seed cotton and seed are removed by each successive cylinder from the preceding cylinder, substantially as described.

6. A cotton gin comprising a substantially horizontal series of saw cylinders so arranged that the saws of adjacent cylinders overlap, and means for rotating the cylinders in the direction of the projection of the teeth of their saws, whereby fiber engaged by the saws of one cylinder is freed from seed by the coaction of such saws with those of an adjacent cylinder and excess of seed cotton and seed are removed by each successive cylinder from the preceding cylinder, substantially as described.

7. A cotton gin comprising a series of saw cylinders so arranged that the saws of adjacent cylinders overlap, means for rotating the cylinders in the direction of the projection of the teeth of their saws, and means for removing fiber from the saws, whereby fiber engaged by the teeth of the saws of one cylinder is freed from seed by the coaction of such saws with those of an adjacent cylinder, and ginned fiber carried between the saws is removed, substantially as described.

8. A cotton gin comprising a series of saw cylinders, the saws of adjacent cylinders being alternately arranged and so disposed that the saws of each cylinder enter between those of adjacent cylinders, the spaces between the saws of adjacent cylinders being unobstructed, whereby fiber engaged by the saws of one cylinder is freed from seed solely by the coaction of such saws with those of an adjacent cylinder, substantially as described.

9. A cotton gin comprising a series of saw cylinders, the saws of all the cylinders being placed at equal distances apart, the cylinders being so arranged that the saws of adjacent cylinders overlap, whereby fiber engaged by the saws of one cylinder is freed from seed by the coaction of such saws with those of an adjacent cylinder, substantially as described.

10. A cotton gin comprising a series of saw cylinders so arranged that the saws of adjacent cylinders overlap, the saws of contiguous cylinders being alternately arranged, whereby fiber engaged by the saws of one cylinder is freed from seed by the coaction of such saws with those of an adjacent cylinder, substantially as described.

11. A cotton gin comprising a series of saw cylinders, having the saws of adjacent cylinders overlapping, the saws of adjacent cylinders being so disposed that a saw of each succeeding cylinder moves operatively on each side of each of the saws of a preceding cylinder, the relative arrangement of the respective cylinders being such that fiber engaged by the saws of one cylinder is freed from seed by the coaction of such saws with those of an adjacent cylinder, substantially as described.

12. A cotton gin comprising a series of saw cylinders so arranged that the saws of adjacent cylinders overlap, the saws of each cylinder being spaced correspondingly to those of adjacent cylinders, whereby seed cotton engaged by the saws of one cylinder is freed from seed by the coaction of such saws with those of an adjacent cylinder, substantially as described.

13. A cotton gin comprising a series of saw cylinders, the cylinders increasing in length from one end to the other of the series, substantially as described.

14. A cotton gin comprising a series of saw cylinders, the saws of each cylinder from one end to the other of the series increasing in number over those of preceding cylinders, substantially as described.

15. A cotton gin comprising a series of saw cylinders, the saws of each succeeding cylinder extending at each end beyond those of an adjacent preceding cylinder, substantially as described.

16. A cotton gin comprising a series of saw cylinders, the saws of each cylinder being so arranged that the saws of each cylinder overlap and coact, the cylinders increasing in length from one end of the series to the other, substantially as described.

17. A cotton gin comprising a series of saw cylinders so arranged that the saws of adjacent cylinders overlap and coact, and means for rotating each cylinder from one end of the series to the other at a greater speed than a preceding cylinder, substantially as described.

18. A cotton gin comprising a series of saw cylinders, each successive cylinder being of greater length than a preceding cylinder, and means for revolving the cylinders whereby each successive cylinder is revolved at a greater speed than a preceding cylinder, substantially as described.

19. A cotton gin comprising a series of saw cylinders, each successive cylinder from one end of the series to the other overlapping at each end the preceding cylinder, substantially as described.

20. A cotton gin comprising a series of saw cylinders, so arranged that the saws of adjacent cylinders overlap and coact, the teeth of the saws of the cylinders at one end of the series being greater in size than those at the other end, substantially as described.

21. A cotton gin comprising a series of saw cylinders so arranged that the saws of adjacent cylinders overlap and coact, a feed arranged adjacent to one end of the series of cylinders, the teeth of the cylinders adjacent to the feed being greater in size than those of the remaining cylinders, substantially as described.

22. A cotton gin comprising a series of saw cylinders, a passage for seed cotton contiguous to the saw cylinders, and yielding means extending into the passage whereby seed cotton and seed are directed against the cylinders, substantially as described.

23. In a cotton gin comprising a series of saw cylinders, a passage for seed cotton extending along and contiguous to the saw cylinders, and projections in the passage for directing the seed cotton against the cylinders, substantially as described.

24. A cotton gin comprising a series of saw cylinders, a passage for seed cotton extending along and contiguous to the saw cylinders, and inclined projections for directing the seed cotton against the cylinders, substantially as described.

25. A cotton gin comprising a series of saw cylinders, a passage for seed cotton extending along and contiguous to the saw cylinders, and brushes for maintaining the seed cotton and seed in the passage in contact with the cylinders, substantially as described.

26. A cotton gin comprising a series of saw cylinders, a passage for seed cotton extending along and contiguous to the saw cylinders, and taper brushes for maintaining the seed cotton and seed in contact with the cylinders, substantially as described.

27. A cotton gin comprising a series of saw cylinders, an inlet for seed cotton, a passage for seed cotton extending along and contiguous to the saw cylinders, and brushes arranged in the passage, the faces of the brushes toward the inlet being a greater distance from the saw cylinders than the remainder of the faces thereof, substantially as described.

28. A cotton gin comprising a series of saw cylinders, a passage for seed cotton contiguous to the saw cylinders, and adjustable yielding means extending into the passage whereby seed cotton and seed is directed against the cylinders, substantially as described.

29. A cotton gin comprising a series of saw cylinders, a passage for seed cotton contiguous to the saw cylinders, and adjustable projections in the passage for directing the seed cotton against the cylinders, substantially as described.

30. A cotton gin comprising a series of saw cylinders, a passage for seed cotton extending contiguous to the saw cylinders, and inclined projections capable of adjustment toward and away from the cylinders, for maintaining the seed cotton in the passage in contact with the cylinders, substantially as described.

31. A cotton gin comprising a series of saw cylinders, and a separate cover composed of hinged sections arranged over each cylinder, substantially as described.

32. A cotton gin comprising a series of saw cylinders, and a separate cover for each cylinder, the covers being composed of hinged sections and being adjustable toward and away from the cylinders, substantially as described.

33. A cotton gin comprising a series of saw cylinders, a sectional cover for each cylinder, and a projection extending from one section of each cover for directing the seed cotton against the cylinder over which it is placed, substantially as described.

34. A cotton gin comprising a series of saw cylinders, a sectional cover for each cylinder, and a brush attached to one section of each cover for directing seed cotton against the cylinder over which it is placed, substantially as described.

35. A cotton gin comprising a series of saw cylinders, a sectional cover for each cylinder, and a brush having an inclined face attached to one of the sections of each cover, substantially as described.

36. A cotton gin comprising a series of saw cylinders, a sectional cover for each cylinder adjustable toward and away from the cylinder, and a brush having an inclined face attached to one section of each cover, substantially as described.

37. A cotton gin comprising a series of saw cylinders, covers for the cylinders extending partially over the upper surface of the cylinders, and deflectors projecting from the outer faces of the covers, substantially as described.

38. A cotton gin comprising a series of saw cylinders a cover for each cylinder partially covering the upper surface of the cylinder, and a deflector extending at an angle across the upper face of the cover, substantially as described.

39. A cotton gin comprising a series of saw cylinders, a cover for each cylinder extending over a portion of the upper surface of the cylinder, and a deflector having an overhanging end extending diagonally across the outer face of the cover, substantially as described.

40. A cotton gin comprising a series of saw cylinders, a passage extending along one face of the series, a covering for the passage having openings therein, and deflectors arranged adjacent to the openings substantially as described.

41. A cotton gin comprising a series of saw cylinders, means for removing fiber from the cylinders, a plurality of conduits receiving the fiber at different points in the series, openings allowing communication between adjacent conduits, and means for opening or closing the openings, substantially as described.

42. A cotton gin comprising a series of saw cylinders, means for removing fiber from the cylinders, a plurality of conduits receiving the fiber at different points in the series, openings allowing communication between adjacent conduits, doors arranged at the openings, rods connected to the doors, and means for locking the rods in different positions, substantially as described.

43. A cotton gin comprising a series of saw cylinders, brushes for removing fiber from the cylinders, conduits for receiving fiber from the brushes, the conduits being provided with adjustable moteboards, substantially as described.

44. A cotton gin comprising a series of saw cylinders, an adjustable board arranged adjacent to the last cylinder of the series, and a receptacle for receiving seed cotton and seed arrested by the board, substantially as described.

45. A cotton gin comprising a series of saw cylinders, arranged and operating substantially as described, and a comb having its teeth engaging the saws of the cylinder at the discharge end of the machine, substantially as described.

46. A cotton gin comprising a series of saw cylinders, a cover having openings communicating with the cylinders, and means arranged adjacent to the last cylinder whereby seed cotton and seed is conveyed from the last cylinder to an opening communicating with a preceding cylinder, substantially as described.

47. A cotton gin comprising a series of saw cylinders, openings adjacent to the cylinders, a receptacle arranged adjacent to the last cylinder, an elevator communicating with the receptacle, and adjustable means for conveying seed cotton and seed from the elevator to an opening adjacent to one of the cylinders, substantially as described.

48. A cotton gin comprising a series of saw cylinders, a covering having openings therein above the cylinders, a receptacle for receiving seed from the last cylinder of the series, an elevator connected with the receptacle, and an extensible nozzle connected with the elevator, substantially as described.

In testimony whereof I affix my signature in presence of two witnesses.

WILLARD D. DOREMUS.

Witnesses:
DAVID H. MEAD,
L. B. TINSLEY.